United States Patent [19]

Rodriguez-Cavazos et al.

[11] Patent Number: 5,517,249

[45] Date of Patent: May 14, 1996

[54] AUXILIARY VIDEO DATA SLICER WITH ADAPTIVE SLICING LEVEL CAPABILITY

[75] Inventors: Enrique Rodriguez-Cavazos; Juri Tults, both of Indianapolis, Ind.

[73] Assignee: Thomson Consumer Electronics, Inc., Indianapolis, Ind.

[21] Appl. No.: 526,607

[22] Filed: Sep. 11, 1995

Related U.S. Application Data

[63] Continuation of Ser. No. 108,848, Aug. 18, 1993, abandoned, which is a continuation of Ser. No. 850,481, Mar. 11, 1992, abandoned.

[51] Int. Cl.$^6$ .................................................. H04N 7/087
[52] U.S. Cl. ................................. 348/465; 348/478
[58] Field of Search ................................ 348/465, 473, 348/478, 476, 477, 479, 468; 358/142, 146, 147, 153; H04N 7/08, 7/04, 7/087

[56]  References Cited

U.S. PATENT DOCUMENTS

| | | | |
|---|---|---|---|
| 4,115,811 | 9/1978 | Goff | 358/167 |
| 4,263,555 | 4/1981 | Hunka | 328/165 |
| 4,318,128 | 3/1982 | Sauvanet | 358/147 |
| 4,358,790 | 11/1982 | Summers | 348/465 |
| 4,380,027 | 4/1983 | Leventer et al. | 358/142 |
| 4,620,227 | 10/1986 | Levin et al. | 358/142 |
| 4,622,586 | 11/1986 | Megeid | 358/153 |
| 4,656,513 | 4/1987 | Langenkamp | 358/147 |
| 4,667,235 | 5/1987 | Nozoe et al. | 358/147 |
| 4,707,730 | 11/1987 | Alard | 358/13 |
| 4,723,165 | 2/1988 | Bart | 358/153 |
| 4,841,365 | 6/1989 | Guenot et al. | 358/147 |
| 4,858,007 | 8/1989 | Schweer et al. | 358/147 |
| 4,937,842 | 6/1990 | Howell | 375/98 |
| 5,136,382 | 8/1992 | Meyer | 348/465 |
| 5,223,930 | 6/1993 | Zato | 358/147 |
| 5,249,050 | 9/1993 | Zato | 358/147 |
| 5,301,023 | 4/1994 | Zato | 348/476 |

FOREIGN PATENT DOCUMENTS

| | | | |
|---|---|---|---|
| 0016503 | 10/1980 | European Pat. Off. | H04L 25/06 |
| 0275597 | 7/1988 | European Pat. Off. | H04N 7/087 |
| 0305772 | 3/1989 | European Pat. Off. | H04N 7/00 |
| 0421897A1 | 4/1991 | European Pat. Off. | H04N 7/00 |
| 103482 | 6/1984 | Japan | H04N 7/08 |
| 60-93891 | 5/1985 | Japan | H04N 7/08 |
| 2006570 | 5/1979 | United Kingdom | H04N 7/08 |
| 90/00645 | 3/1991 | WIPO | H04N 7/00 |
| PCT/FR90/ 00645 | 3/1991 | WIPO | H04N 7/00 |

*Primary Examiner*—Safet Metjahic
*Assistant Examiner*—Chris Grant
*Attorney, Agent, or Firm*—Joseph S. Tripoli; Peter M. Emanuel; Robert D. Shedd

[57]  ABSTRACT

A data slicer for extracting auxiliary video data from a video signal adapts a data slicing level to the amplitude of the data signal as indicated by the average value of a run-in clock (RIC) signal that is included in the video signal. Control of the slicing level occurs during a window interval that spans an integral number of cycles of the RIC signal. The presence of the RIC signal within the window interval may be verified as part of the slicing level adjustment operation. The data slicer is suitable for implementation in a digital integrated circuit.

23 Claims, 4 Drawing Sheets

AUXILIARY VIDEO DATA SLICER WITH ADAPTIVE SLICING LEVEL CAPABILITY

CROSS REFERENCE TO RELATED APPLICATION

This is a continuation of application Ser. No. 08/108,848, filed Aug. 18, 1993 abandoned which is a continuation of Ser. No. 07/850,481 filed Mar. 11, 1992 now abandoned. Concurrently-filed U.S. patent application Ser. No. 850,199 now U.S. Pat. No. 5,371,545 (by J. Tults entitled "AUXILIARY VIDEO DATA DECODER WITH LARGE PHASE TOLERANCE") and assigned to the same assignee as the subject application contains related subject matter.

FIELD OF THE INVENTION

The present invention relates to detection of information that may be present in a video signal during blanking or overscan intervals.

BACKGROUND OF THE INVENTION

A video signal typically includes vertical display intervals, or fields, having a plurality of horizontal line intervals, e.g. 262.5 lines per field in NTSC video systems. The beginning of each vertical and horizontal interval is identified by respective vertical and horizontal sync pulses that are included in a composite video signal. During a portion of each vertical interval, information in the video signal may not be intended for display. For example, a vertical blanking interval spans approximately the first 20 horizontal line intervals in each field. In addition, several line intervals adjacent to the vertical blanking period, e.g. line 21, may be within an overscan region of a video display and will not be visible.

The lack of displayed image information during blanking and overscan intervals makes it possible to insert an auxiliary information component, e.g. teletext or closed caption data, into these intervals. Standards such as Federal Communications Commissions (FCC) Regulations define the format for each type of auxiliary information including the positioning of the information within a vertical interval. For example, the present closed captioning standard (see e.g. 47 CFR §§ 15.119 and 73.682) specifies that digital data corresponding to ASCII characters for closed captioning must be in line 21 of field 1.

The first step in extracting auxiliary video information is to locate the auxiliary information. Various approaches may be used depending on the type of information involved. For example, recognition of teletext data characteristics such as the framing code pattern is a method of locating teletext data. Closed caption information in line 21 may be located by counting video lines, e.g. counting horizontal sync pulses. Examples of line counting approaches to detecting auxiliary video data may be found in pending International Patent Applications Nos. PCT/US92/04825 and PCT/US92/04826 by J. Tults filed on 2 Jul. 1991 and assigned to the same assignee as the present application.

After the auxiliary video information is located, the information must be extracted. In the case of digital data, a "data slicer" may be used to convert the video signal into binary data. A data slicer typically operates by comparing the video signal level to a reference level known as the slicing level. For video levels that exceed the slicing level, the comparison produces a logic 1. Video levels that are less than the slicing level produce a logic 0. As an example, closed caption data in line 21 of the video signal may exhibit a signal amplitude range of 0 IRE to 50 IRE. For a signal range of 0 IRE to 50 IRE, a slicing level of 25 IRE would be appropriate.

A constant slicing level may not be adequate for all video signals. Video signal levels may vary depending on the source of the video signal. Utilizing a constant slicing level with varying video signal levels may bias the extracted data undesirably toward logic 0 or logic 1 resulting in erroneous data extraction. For example, if the video signal range is 0 IRE to 20 IRE rather than 0 IRE to 50 IRE, a slicing level of 10 IRE rather than 25 IRE is desirable. If 25 IRE were used as a slicing level for a signal range of 0 IRE to 20 IRE, a logic 1 would never be extracted because the signal never exceeds the slicing level. Thus, it is desirable to adapt the slicing level to the amplitude of the input video signal.

Another possible problem with a constant slicing level is that the switching threshold level of components used in a data slicer may vary as a function of temperature, supply voltage, or manufacturer. As an example, a CMOS inverter may be constructed using PMOS and NMOS field effect transistors (FET). Matching the current conducting characteristics of these devices makes it possible to design the switching threshold to be approximately midway between the power supply extremes of the inverter. The current conducting characteristics of the devices in the inverter may, however, vary as a result of temperature and supply voltage changes or different integrated circuit fabrication techniques causing the switching threshold to change. If the amplitude of an auxiliary video data signals is low, e.g. 50 IRE (approximately 350 mV for a 1 V peak-to-peak video signal), changes of component switching thresholds with respect to a fixed slicing level might significantly decrease the accuracy of data extraction. It may be desirable, therefore, to adapt the slicing level to compensate for component variations.

The format of an auxiliary information component such as closed caption data includes provisions to facilitate an adaptive slicing level function. For example, a closed caption signal in line 21 of field 1 begins after the "back porch" interval with a 7 cycle burst of a sinusoidal reference signal designated the "run-in clock" (RIC). The closed caption data standard establishes that the amplitude of the RIC signal is identical to the amplitude of the data signal that occurs during the latter half of the line 21 interval. Thus, the average of the RIC signal amplitude is an appropriate slicing level for the subsequent data signal.

Auxiliary data such as closed-caption data may not exist in all video signals. For example, switching between different video sources may result in switching from one signal having closed caption data to another source that does not. If no auxiliary video data exists, there will be no RIC signal to serve as the basis for modifying the slicing level. Attempting to adjust the slicing level when a RIC signal is not present may produce an incorrect slicing level.

Current video signal processing approaches typically involve digital signal processing functions implemented in digital integrated circuits (IC). It may be desirable to include a data slicer function in a digital signal processing IC. Analog approaches to data slicing (see e.g. U.S. Pat. No. 4,115,811 (Goff) and U.S. Pat. No. 4,358,790 (Summers)) typically involve analog functions such as analog signal comparators that may be difficult to implement in a digital IC's. However, certain digital data slicers (see e.g. U.S. Pat. No. 4,656,513 (Langenkamp) and U.S. Pat. No. 4,858,007 (Schweer et al.)) may require complex digital circuitry that may undesirably require an excessive percentage of the available chip area in a complex digital signal processing IC.

SUMMARY OF THE INVENTION

A data slicer for extracting auxiliary video data from a video signal adapts a data slicing level to the amplitude of the data signal as indicated by the average value of a run-in clock (RIC) signal that is included in the video signal. Control of the slicing level occurs during a window interval that spans an integral number of cycles of the RIC signal. The presence of the RIC signal within the window interval may be verified as part of the slicing level adjustment operation. The data slicer is suitable for implementation in a digital integrated circuit.

DETAILED DESCRIPTION OF THE DRAWING

Figure 1:
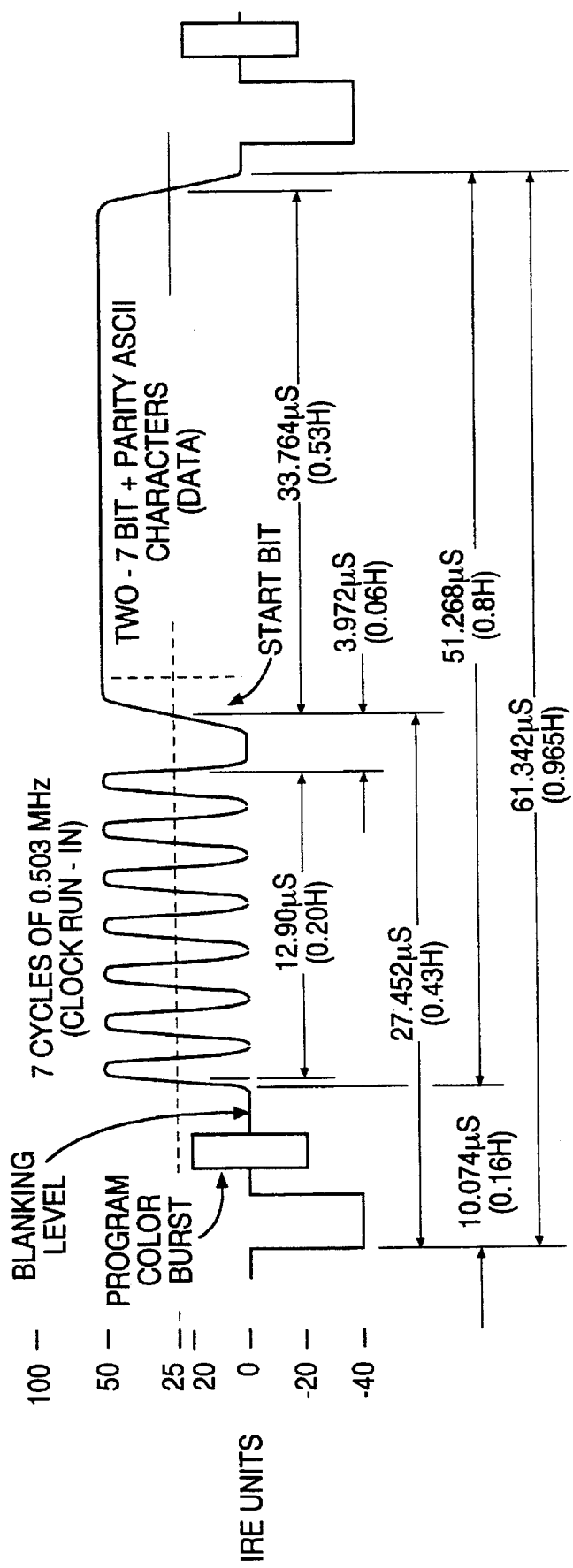
FIG. 1 shows an example of an auxiliary video data waveform.

The operation of the exemplary embodiment of the invention shown in FIG. 2 will be explained in the context of closed caption data that complies with the FCC standard (see e.g. 47 CFR §§ 15.119 and 73.682) closed caption signal depicted in FIG. 1. As discussed further below, the invention may also be applicable to the extraction of other forms of auxiliary video data such as teletext.

Figure 2:
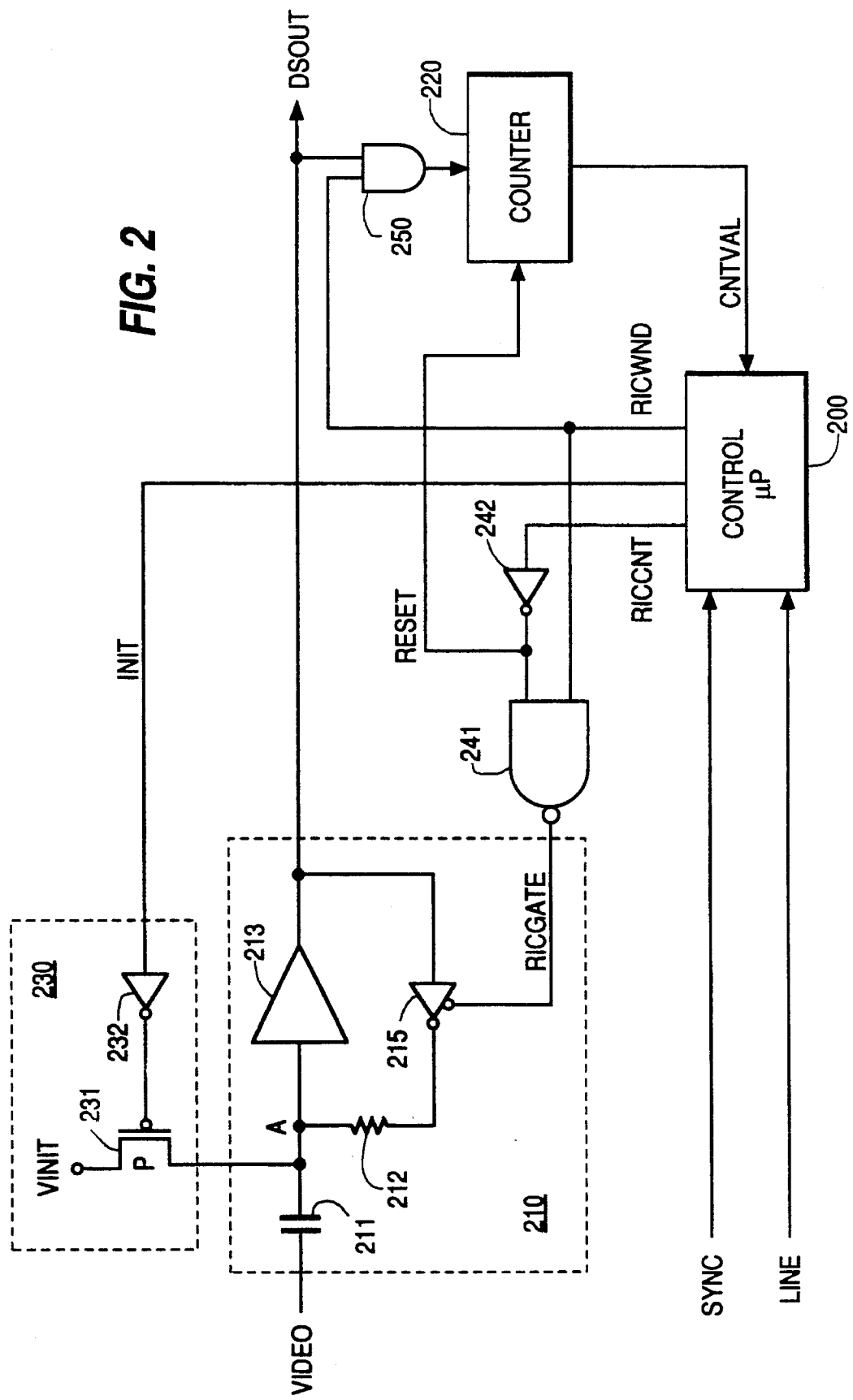
FIG. 2 shows, partially in block diagram form and partially in schematic form, an embodiment of the invention.

In FIG. 2, a composite video signal VIDEO is input to data slicer 210. Data slicer 210 converts auxiliary video data, e.g. closed caption data, included in signal VIDEO into a digital data stream identified in FIG. 2 as signal DSOUT. Logic 0 and logic 1 levels in signal DSOUT represent levels of signal VIDEO that are less than and exceed, respectively, the slicing level of data slicer 210.

Data slicer 210 includes input coupling capacitor 211 for coupling video signal VIDEO to the input of buffer amplifier 213 at node A in FIG. 2. Signal DSOUT is produced at the output of buffer amplifier 213. A signal VA at node A includes an AC component VAAC from video signal VIDEO and a DC component VADC. If signal VA exceeds a switching threshold voltage VT of buffer amplifier 213, a logic 1 value is generated on signal DSOUT. Values of signal VA below switching threshold voltage VT cause buffer amplifier 213 to generate a logic 0 on signal DSOUT. Thus, the slicing level with respect to signal VA is at switching threshold voltage VT. However, the slicing level of interest for purposes of accurately converting auxiliary video data (represented by AC component VAAC) into logic values is the slicing level with respect to AC component VAAC. As described below, the slicing level with respect to AC component VAAC may be controlled by varying DC component VADC.

The slicing level of data slicer 210 with respect to AC component VAAC is determined by the relationship between DC component VADC and switching threshold voltage VT. The most reliable slicing of AC component VAAC into digital logic 1 and logic 0 values occurs when the average value of the peak-to-peak amplitude of signal VAAC is at voltage VADC and voltage VADC equals switching threshold voltage VT (see e.g. FIG. 3(A)). Under this condition, signal VAAC extends equally above and below switching threshold voltage VT and undesirable biasing of the slicing operation in favor of a particular logic state is prevented.

The average value of signal VAAC may not equal switching threshold voltage VT as desired. For example, switching threshold voltage VT may vary as discussed above. If voltage VADC is less than switching threshold voltage VT (FIG. 3(B)), the average value of signal VAAC is offset below switching threshold voltage VT by an amount equal to VT minus VADC. Similarly, values of voltage VADC above voltage VT produce an offset of signal VAAC above voltage VT. Under either offset condition, the mid-point of the peak-to-peak range of signal VAAC is not at switching threshold voltage VT and inaccurate data slicing of signal VAAC may result. As described below, voltage VADC is controlled to cause the average of the peak-to-peak range of signal VAAC to be at switching threshold voltage VT.

In the exemplary embodiment shown in FIG. 2, voltage VADC is controlled via a feedback path comprising tristate inverting buffer 215 and resistor 212. The feedback path is coupled between data slicer output DSOUT and the input of buffer 213. Voltage VADC is modified when the feedback path is conducting (tristate inverting buffer 215 enabled). A control circuit comprising control microprocessor 200, NAND gate 241, inverter 242, and counter 220 controls the operation of the described functions.

It may be desirable to initialize voltage VADC at certain times, e.g. following turn on of the system. Initialization to a voltage such as the expected switching threshold voltage of buffer 213 may decrease the time required to complete the adjustment of voltage VADC. Various approaches to initialization are possible. For illustrative purposes, the embodiment shown in FIG. 2 includes initialization circuit 230. When initialization is desired control microprocessor 200 enables initialization circuit 230 by forcing signal INIT to a logic 1. Signal INIT at logic 1 causes PMOS transistor 231 to conduct, thereby forcing node A to approximately voltage VINIT. The value of VINIT may be, for example, the expected value of switching threshold voltage VT. The initialization circuitry is then disabled (signal INIT forced to logic 0).

Voltage VADC may be modified via low impedance paths through either initialization circuit 230 or the feedback path comprising resistor 212 and tristate inverting buffer 215. After voltage VADC is established, the DC level may be retained substantially unchanged at node A for an extended period of time if buffer 213 has a high input impedance (e.g. a CMOS inverter) and if the low impedance paths coupled to node A are disabled. Leakage current effects, e.g. through disabled initialization circuit 230, may be ignored if voltage VADC is adjusted periodically in the manner described below.

When adjustment of voltage VADC is to occur, e.g. following initialization or periodically, control μP 200 enables the feedback loop by forcing signal RICGATE to a logic 0. For reasons explained below, the adjustment of voltage VADC is timed to occur when the RIC signal is active on signal VIDEO. At this time, the RIC signal also appears at node A as signal VAAC. Microprocessor 200 evaluates synchronization signal SYNC and line indicator signal LINE to determine when auxiliary video data and a RIC signal should be present on signal VIDEO. Signal RICGATE is forced to logic 0 to enable tristate inverting buffer 215 during the RIC interval. As explained below, adjustment of voltage VADC should occur during an integral number of cycles of the RIC signal. The RICGATE signal is established by μP 200 to span an integral number of RIC cycles to provide the desired adjustment interval.

When the feedback loop is enabled, oscillations may appear on signal DSOUT. The frequency of the oscillations is determined by the delay around the feedback loop. For example, a waveform having a period equal to double the loop delay will experience positive feedback (360 degree phase shift) around the inverting feedback loop, thereby introducing the potential for oscillations. Oscillations on signal DSOUT during the RIC interval do not adversely affect auxiliary video data capture circuitry coupled to signal DSOUT. Auxiliary video data occurs during the data interval of the auxiliary video signal when the feedback loop is disabled. Thus, the oscillations will not exist on signal DSOUT when data capture is in progress.

Any oscillations that may exist will have a negligible effect on the described approach to controlling voltage VADC. As discussed below, a waveform symmetrical with respect to switching threshold voltage VT is intentionally established at node A when the slicing level is adjusted. An oscillation waveform will be substantially symmetrical at node A and will not, therefore, adversely affect slicing level adjustment that occurs in response to a symmetrical waveform.

When tristate inverting buffer 215 is enabled, voltages at node A that are above the threshold of buffer 213 will produce logic levels of 1 and 0 at the outputs of buffer 213 and tristate inverting buffer 215, respectively. Assuming the voltage represented by logic 0 at the output of tristate inverting buffer 215 is less than the voltage at node A, the low impedance path to ground represented by the logic 0 at the output of tristate inverting buffer 215 will act to discharge capacitor 211 and decrease the voltage at node A. If the voltage at node A is below the threshold of buffer 213, logic levels of 0 and 1 will be produced at the outputs of buffer 213 and tristate inverting buffer 215, respectively. Assuming the logic 1 voltage at the output of tristate inverting buffer 215 is greater than the voltage at node A, capacitor 211 will charge via resistor 212 and the voltage at node A will increase. Thus, the voltage at node A will tend toward the switching threshold level of buffer 213 when the feedback loop is enabled.

If the signal at node A has an AC component VAAC (e.g. in response to signal VIDEO) when the feedback loop is enabled, the variations of signal VAAC may affect voltage VADC. If signal VAAC is symmetrical about signal VADC during the feedback interval, voltage VADC will change during the feedback interval in a manner that will cause voltage VADC to be substantially equal to switching threshold voltage VT of buffer 213. In FIG. 3(B), for example, signal VAAC is symmetrical about voltage VADC during the interval shown. However, signal VAAC is not symmetrical about switching threshold voltage VT. As FIG. 3(B) shows, signal VAAC is less than switching threshold voltage VT for a greater period of time than it is above switching threshold voltage VT. As a result, the above-described operation of the feedback loop will act to increase voltage VADC for a greater interval than the interval when voltage VADC is being decreased. The net effect will be an increase in voltage VADC. If voltage VADC is greater than voltage VT rather than less than voltage VT as in FIG. 3(B), the net effect will be a decrease in voltage VADC. In either case, the operation of the feedback loop acts to decrease the magnitude of the difference between voltages VADC and VT.

If signal VAAC is symmetrical about voltage VADC during the feedback interval, the net change in voltage VADC will continue (assuming the feedback loop is enabled for a sufficient interval) until voltage VADC substantially equals voltage VT. Signal VAAC is then symmetrical about voltages VADC and VT (see e.g. FIG. 3(A)). Thus, activating the feedback loop during an interval encompassing a symmetrical waveform of sufficient duration will cause voltage VADC to be at both the switching threshold voltage of buffer 213 and the midpoint of the signal range. Therefore, data slicing will occur at the mid-point of the range of the symmetrical signal. If the symmetrical signal is a RIC signal, data slicing will also occur at the mid-point of the range of the data signal that follows the RIC signal because the amplitude of the RIC signal is equal to the amplitude of the data signal.

Figure 3:
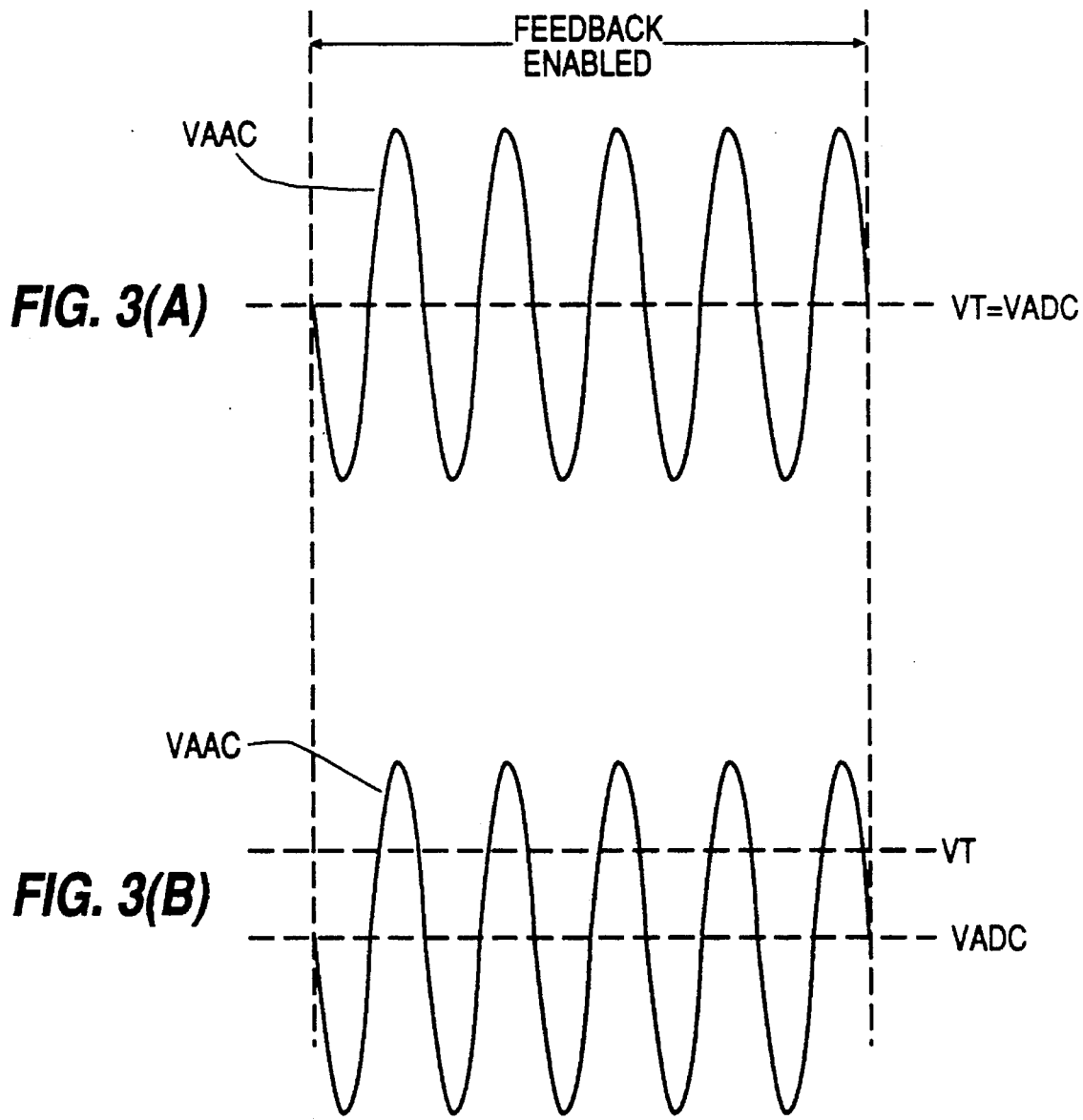
FIGS. 3A, 3B and 4 show signal waveforms useful for understanding the operation of the embodiment in FIGS. 2.

In the present exemplary embodiment, signal VAAC is made symmetrical with respect to switching voltage VT during the feedback interval by timing the feedback interval to span an integral number of cycles of the RIC signal. This condition is depicted in FIG. 3 where 5 cycles of a RIC waveform occur while feedback is enabled. For a RIC signal in a closed caption signal, five cycles of the 503 kHz RIC signal will occur during approximately 10 μs. Thus, enabling the feedback loop by setting signal RICGATE to logic 0 for 10 μs when the RIC signal is active will provide the desired symmetrical reference waveform at node A in FIG. 2. The RICGATE signal period may be timed by μP 200 to coincide with the RIC signal based on synchronizing signals SYNC and LINE and the timing specified in the FCC specification for closed caption signals (see e.g. 47 CFR §§ 15.119 and 73.682).

The interval required to adjust voltage VADC to equal voltage VT may exceed the duration of an integral number of cycles of the RIC signal within one line 21 interval. The described exemplary adaptive slicing level system includes charging and discharging capacitor 211 via resistor 212. The time constants associated with the charging and discharging operation determine how rapidly the voltage at node A will change. A relatively long time constant in comparison to the RIC interval (e.g. capacitor and resistor values of 1 μF and 10 kΩ, respectively) combined with an initial voltage at node A that differs significantly from the desired value will prevent the voltage at node A from reaching the desired value during one RIC signal interval. It may be necessary, therefore, to activate the feedback network during more than one occurrence of the RIC signal. One approach to this problem is to close the feedback loop and adjust the slicing level during every RIC interval. This approach simplifies the control circuitry and insures that any leakage current effects at node A will be corrected by the repetitive adjustment of the slicing level. If leakage current effects are not significant, slicing level adjustment could be enabled for a predetermined number of RIC intervals sufficient to overcome the time constants of the circuit and then disabled. Any leakage effects could be overcome by periodic readjustment of the slicing level.

If signal VIDEO is certain to include auxiliary video data having the desired reference or RIC signal, the slicing level may be adapted as described above. If, however, the presence of auxiliary video data is uncertain, it may be desirable to include a feature to verify that the RIC signal is present during the feedback enabling interval. If the feedback loop is enabled and no symmetrical reference is present, an inaccurate slicing level may be generated.

Counter 220 is included in the exemplary embodiment shown in FIG. 2 for the purpose of verifying the presence of the RIC signal. Counter 220 is cleared when signal RESET at the output of inverter 242 is at logic 1 in response to signal RICCNT being at logic 0. Counting is enabled when signals RICCNT and RICWND are at logic 1 because signal RICCNT at logic 1 deactivates (forces to logic 0) signal RESET and signal RICWND at logic 1 enables pulses on signal DSOUT to clock counter 220 via AND gate 250. Signals RICCNT and RICWND are also logically combined in NAND gate 241 to generate signal RICGATE for controlling enabling of the feedback loop.

When enabled, counter 220 counts pulses occurring on signal DSOUT. For the above-described case of a 10 µs feedback interval, five cycles of signal RIC should occur during the feedback interval. As a result, five pulses corresponding to the five peaks of the RIC signal should occur on signal DSOUT. If the RIC signal is present as expected, count value CNTVAL should be equal to five after the end of the counting interval. Count value CNTVAL is evaluated by µP 200. If count value CNTVAL is not five as expected, µP 200 may produce a control signal (not shown in FIG. 2) indicating to the video signal processing system that auxiliary video data was not present as expected. The system may respond by, for example, ceasing auxiliary video data processing, or by delaying processing until another video source (e.g. a different program or channel) that may contain auxiliary video data is selected, or by repeating the test on the present signal after a delay.

The described control arrangement including signals RICCNT, RICWND, and RICGATE prevents counter 220 from counting while the feedback loop is enabled. The above-described oscillations that are produced on signal DSOUT when the feedback loop is enabled would cause count value CNTVAL to be an inaccurate indication of the presence of the RIC signal. More specifically, the counter would count the peaks of the oscillation waveform rather than the peaks of the RIC waveform.

Enabling of the feedback loop and enabling of the counter are synchronized to avoid inaccurate count values as follows. Signal RICWND defines the duration of the feedback (or counting) interval. Signal RICCNT indicates whether feedback or counting will occur. The feedback loop is enabled (signal RICGATE at logic 0) and the counter is disabled when signal RICWND is at logic 1 and signal RICCNT is at logic 0 (signal RESET at logic 1). Counting is enabled and the feedback loop is disabled when signal RICWND is at logic 1 and signal RICCNT is at logic 1. A possible sequence of operation of the system might include initializing the slicing level, activating the feedback loop (counter disabled) to adapt the slicing level (initially assume the RIC signal is present), enabling the counter (disabling the feedback) during one window interval, and evaluating the count to determine if the RIC signal is present.

Figure 4:
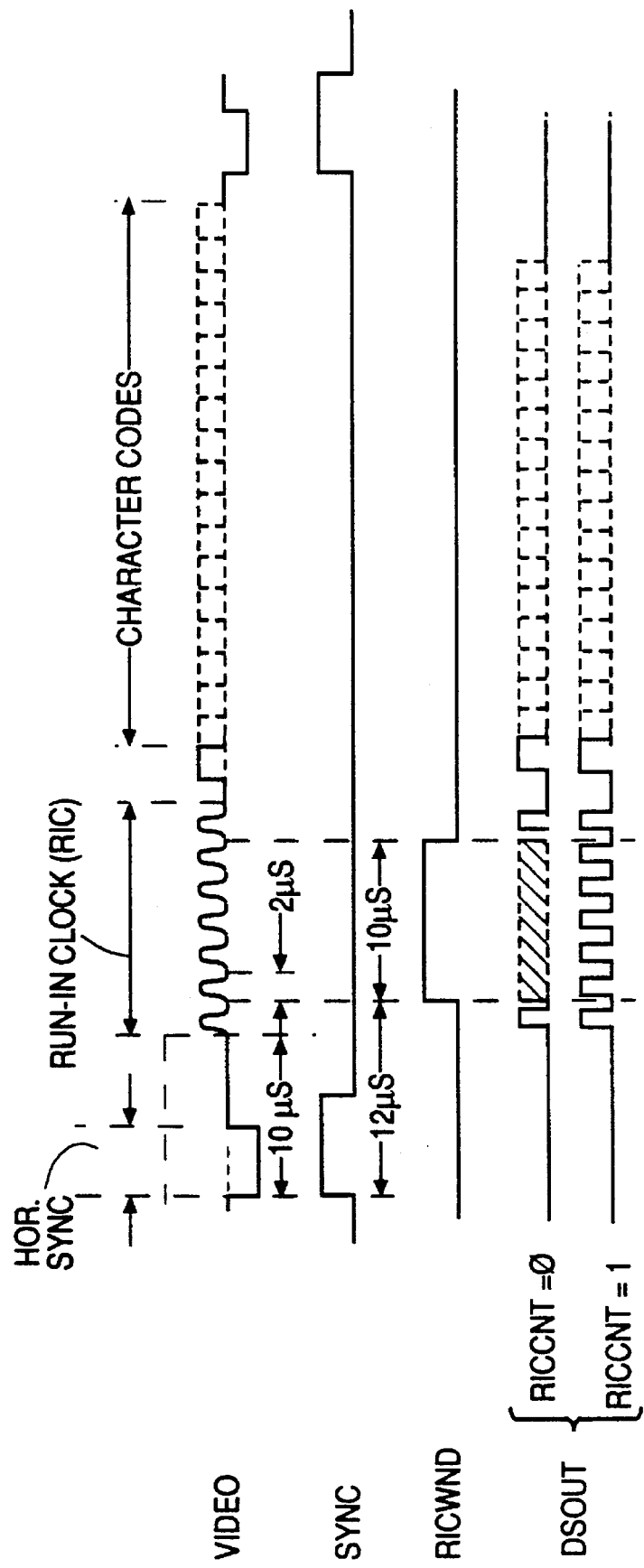

An example of the operation of signals RICWND and RICCNT is shown in FIG. 4. Two separate waveforms for signal DSOUT are shown in FIG. 4. The upper DSOUT waveform depicts the DSOUT signal when signal RICCNT is at logic 0. In this case, the feedback loop is enabled to adjust the slicing level during the interval when RICWND is at logic 1. Oscillations may exist on signal DSOUT when the feedback loop is enabled causing signal DSOUT to be undefined as shown in the upper DSOUT waveform. In the lower DSOUT waveform, signal RICCNT is at logic 1 which disables the feedback loop. As a result, signal DSOUT pulses in response to the RIC signal during the interval when signal RICWND is at logic 1. Thus, accurate counting of the pulses on signal DSOUT is possible during the interval established by the pulse on signal RICWND if signal RICCNT is at logic 1.

Although the lower DSOUT waveform in FIG. 4 indicates that signal RICCNT is at a fixed level during the line 21 interval, an alternative approach (not shown in FIG. 4) would be to produce a pulse to logic 1 on signal RICCNT when counting is to be enabled. For example, the desired synchronization of the counter and feedback loop would be provided if a pulse on signal RICCNT is timed such that the pulse on signal RICWND occurs during the period of the RICCNT pulse.

Although the invention has been described in the context of closed caption data, the invention may also be applicable to other forms of auxiliary video data, e.g. teletext. In the case of other forms of data, the system may require certain modifications. For example, the teletext standard permits teletext data to appear on a number of video lines, e.g. lines 17 to 20. Thus, for a teletext system, signal LINE shown in FIG. 2 may have to be generated by means other than the above-described line counter.

The operation of the disclosed system may be modified in other ways to accommodate alternative auxiliary data formats. As an example, if the format of the reference signal (RIC signal in the described embodiment) changes, the disclosed hardware (or software of µP 200) can easily be changed to operate correctly with various data formats. Modifications of this type may include adapting the system for reference signals having characteristics (e.g. amplitude, waveform, frequency) that differ from the described exemplary RIC signal. In particular, the duration of the feedback interval may easily be changed to span an integral number of cycles for RIC signals of other frequencies. In addition, the feedback interval may span an integral number of cycles other than five as described above.

Other modifications of the invention may also be evident to one skilled in the art. For example, functions shown as separate hardware blocks in FIG. 2, e.g. counter 220, may be incorporated into the operations performed by µP 200.

These and other modifications are intended to be within the scope of the invention as defined by the following claims.

What is claimed is:

1. A data slicer for processing a video signal including a plurality of periodic horizontal line intervals and tending to have an auxiliary information signal component occurring during at least one of said horizontal line intervals, said auxiliary information signal component including a reference signal component comprising a plurality of periodic amplitude variations, said data slicer providing a binary signal representative of said auxiliary information signal component and comprising:

an amplifier having an input coupled to receive said video signal for providing said binary signal at an output, said binary signal having a first value when said video signal exceeds a threshold level and having a second value when said video signal is less than said threshold level;

feedback means responsive to a control signal for coupling said amplifier output to said amplifier input during a feedback interval comprising at least one of a plurality of predetermined intervals including respective portions of said periodic amplitude variations of said reference signal component for modifying a DC component at said amplifier input in response to said binary signal during said feedback interval; and means responsive to a synchronizing signal indicating the occurrence of said horizontal line intervals that may contain said auxiliary information signal component for determining if said auxiliary information signal component is present during at least one of said horizontal line intervals, and for generating said control signal to enable said feedback means during said feedback interval if said auxiliary information signal component is present;

said means for determining if said auxiliary information signal component is present comprises:

means responsive to said video signal for counting cycles of said periodic variation of said reference signal component to produce a count, said counting means being enabled to count during at least one of said predetermined intervals; and means for evaluating said count to determine whether a predetermined substantially integral number of cycles of said periodic amplitude variations of said reference signal component are present during said predetermined interval;

said control signal disables said feedback means during said predetermined intervals when said counting means is enabled, and disables said counting means during said predetermined intervals when said DC signal component modifying means is enabled.

2. The apparatus of claim 1 wherein said feedback interval includes a substantially integral number of cycles of said periodic amplitude variations of said reference signal component.

3. The apparatus of claim 1 wherein said predetermined intervals includes a predetermined substantially integral number of cycles of said periodic variations of said reference signal component.

4. A data slicer for processing a video signal to provide a binary signal representative of an auxiliary information signal component included in said video signal, said auxiliary information signal component including a reference signal component comprising a plurality of periodic amplitude variations, said data slicer comprising:

an amplifier having an input coupled to receive said video signal for providing said binary signal at an output, said binary signal having a first value when said reference signal component exceeds a threshold level and having a second value when said reference signal component is less than said threshold level;

feedback means responsive to a control signal for coupling said amplifier output to said amplifier input during a feedback interval including a portion of said periodic amplitude variations of said reference signal component for modifying a DC component at said amplifier input in response to said binary signal during said feedback interval;

means for generating said control signal in response to a synchronizing signal indicative of the occurrence of said horizontal line intervals containing said auxiliary information; and means for establishing an initial value of said DC component in response to a second control signal; wherein said control signal generating means generates said second control signal during an initialization interval.

5. The apparatus of claim 4 wherein said initial value is a level representative of an expected value of said threshold level.

6. The apparatus of claim 5 wherein said feedback interval includes a plurality of intervals of said reference signal component, each of said plurality of intervals occurring during a respective one of a plurality of horizontal line intervals that are included in said video signal and that include said auxiliary information component.

7. A data slicer for processing a video signal including a plurality of periodic horizontal line intervals and tending to have an auxiliary information signal component occurring during at least one of said horizontal line intervals, said auxiliary information signal component including a reference signal component comprising a plurality of periodic amplitude variations, said data slicer providing a binary signal representative of said auxiliary information signal component and comprising:

an amplifier having an input coupled to receive said video signal for providing said binary signal at an output, said binary signal having a first value when said video signal exceeds a threshold level and having a second value when said video signal is less than said threshold level;

feedback means responsive to a control signal for coupling said amplifier output to said amplifier input during a feedback interval comprising at least one of a plurality of predetermined intervals including respective portions of said periodic amplitude variations of said reference signal component for modifying a DC component at said amplifier input in response to said binary signal during said feedback interval;

means responsive to a synchronizing signal indicating the occurrence of said horizontal line intervals that may contain said auxiliary information signal component for determining if said auxiliary information signal component is present during at least one of said horizontal line intervals, and for generating said control signal to enable said feedback means during said feedback interval if said auxiliary information signal component is present; and means for establishing an initial value of said DC component in response to a second control signal; wherein said control signal generating means generates said second control signal during an initialization interval.

8. The apparatus of claim 7 wherein said initial value is a level representative of an expected value of said threshold level.

9. In a system for processing a video signal, said video signal including a plurality of periodic horizontal line intervals and tending to have an auxiliary information signal component occurring during at least one of said horizontal line intervals, said auxiliary information signal component having a reference signal component and a data signal component, said reference signal component varying periodically at a predetermined frequency, apparatus comprising:

means having an input coupled to said video signal for producing an output signal having one of first and second values, said output signal having said first value when said video signal exceeds a predetermined threshold level and said output signal having said second value when said video signal is less than said predetermined threshold level;

means responsive to a control signal for modifying the value of a DC signal component at said input of said output producing means during at least one of a plurality of predetermined intervals such that the magnitude of the difference between the value of said predetermined threshold level and the value of said DC signal component is decreased; and means responsive to a synchronizing signal indicating the occurrence of said horizontal line intervals that may contain said auxiliary information signal component for determining if said auxiliary information signal component is present during at least one of said horizontal line intervals that may contain said auxiliary information component, and for generating said control signal to enable said DC signal component modifying means during at least one of said predetermined intervals if said auxiliary information signal component is present; wherein said predetermined intervals being defined by said control signal to include at least a portion of said reference component;

said means for determining if said auxiliary information signal component is present comprises:

means responsive to said video signal for counting cycles of said periodic variation of said reference signal component to produce a count, said counting means being enabled to count during at least one of said predetermined intervals; and means for evaluating said count to determine if said predetermined integral number of said cycles of said reference component are present during said predetermined interval; and wherein said control signal disables said DC signal component modifying means during said predetermined intervals when said counting means is enabled, and disables said counting means during said predetermined intervals when said DC signal component modifying means is enabled.

10. The apparatus of claim 9 wherein said predetermined intervals includes a predetermined substantially integral number of cycles of said periodic variation of said reference component.

11. The apparatus of claim 9 further comprising means for establishing an initial value of said DC signal component in response to a second control signal; wherein said control signal generating means generates said second control signal during an initialization interval.

12. The apparatus of claim 11 wherein said initial value is a level representative of an expected value of said predetermined threshold level.

13. In a system for processing a video signal, said video signal including an auxiliary information signal component occurring during at least one of a plurality of periodic horizontal line intervals of said video signal, said auxiliary information signal component having a reference signal component and a data signal component, said reference signal component varying periodically at a predetermined frequency, apparatus comprising:

means having an input coupled to said video signal for producing an output signal having one of first and second values, said output signal having said first value when said video signal exceeds a predetermined threshold level and said output signal having said second value when said video signal is less than said predetermined threshold level;

means for modifying the value of a DC signal component at said input of said output producing means in response to said periodic variations of said reference signal component occurring during a predetermined interval defined by a control signal such that the magnitude of the difference between the value of said predetermined threshold level and the value of said DC signal component is decreased;

means for generating said control signal in response to a synchronizing signal indicative of the occurrence of said horizontal line intervals containing said auxiliary information; and means for establishing an initial value of said DC signal component in response to a second control signal; wherein said control signal generating means generates said second control signal during an initialization interval.

14. The apparatus of claim 13 wherein said initial value is a level representative of an expected value of said predetermined threshold level.

15. A data slicer comprising:

an amplifier having an input coupled to receive a video signal for producing a binary output signal in response to said video signal; said binary output signal having a first value in response to values of said video signal exceeding a threshold level exhibited by said amplifier and having a second value in response to values of said video signal less than said threshold level;

means operative during a first interval for establishing at said input of said amplifier a DC signal component representative of said threshold level exhibited by said amplifier; and means for controlling said DC signal component at said input of said amplifier in response to said binary output signal produced during a second interval including a portion of a periodic reference signal component of said video signal.

16. The data slicer of claim 15 wherein said DC signal component established during said first interval is representative of an expected value of said threshold level exhibited by said amplifier.

17. The data slicer of claim 16 wherein said means for controlling said DC signal component decreases the magnitude of a difference between said threshold level exhibited by said amplifier and said DC signal component at said input of said amplifier.

18. The data slicer of claim 17 wherein said means for controlling said DC signal component comprises a feedback path for coupling said output of said amplifier to said input of said amplifier during said second interval.

19. A system for processing a video signal comprising:

an amplifier having an input coupled to receive said video signal for producing an output signal in response to said video signal; said output signal having a first value in response to values of said video signal exceeding a threshold level exhibited by said amplifier and having a second value in response to values of said video signal less than said threshold level;

control means for determining during a first interval whether said video signal includes a first portion of a periodic amplitude variation of a reference signal component of said video signal; and feedback means for coupling said output of said amplifier to said input of said amplifier during a second interval including a second portion of said periodic amplitude variation for modifying a DC signal component at said input of said amplifier, and for decoupling said output signal from said input during said first interval for substantially preventing modification of said DC signal component at said input of said amplifier.

20. The system of claim 19 wherein said feedback means during said second interval decreases the magnitude of a difference between said threshold level of said amplifier and said DC signal component at said input of said amplifier.

21. The system of claim 20 wherein said control means comprises:
   a counter enabled for counting during said first interval and disabled to prevent counting during said second interval; said counter producing a count of said periodic amplitude variation of said reference signal component during said first interval; and
   means for evaluating said count.

22. The system of claim 21 further comprising means for establishing an initial DC level at said input of said amplifier during an initialization interval preceding said first interval.

23. The system of claim 22 wherein said initial DC level represents an expected value of said threshold level exhibited by said amplifier.

* * * * *